(12) United States Patent
Crawford

(10) Patent No.: US 7,089,954 B2
(45) Date of Patent: Aug. 15, 2006

(54) FUEL TANK VENT SYSTEM WITH VARIABLE-HEIGHT FUEL LEVEL SHUT-OFF PORT

(75) Inventor: Jason M. Crawford, Connersville, IN (US)

(73) Assignee: Stant Manufacturing Inc., Connersville, IN (US)

( * ) Notice: Subject to any disclaimer, the term of this patent is extended or adjusted under 35 U.S.C. 154(b) by 117 days.

(21) Appl. No.: 10/956,629

(22) Filed: Oct. 1, 2004

(65) Prior Publication Data

US 2006/0070656 A1    Apr. 6, 2006

(51) Int. Cl.
*F16K 24/04* (2006.01)

(52) U.S. Cl. .......................................... 137/202; 137/43

(58) Field of Classification Search ............... 137/202, 137/43

See application file for complete search history.

(56) References Cited

U.S. PATENT DOCUMENTS

| 5,449,029 | A | 9/1995 | Harris |
| 5,694,968 | A | 12/1997 | Devall et al. |
| 6,035,884 | A | 3/2000 | King et al. |
| 6,170,510 | B1 | 1/2001 | King et al. |
| 6,701,950 | B1 | 3/2004 | Brock et al. |
| 6,708,713 | B1* | 3/2004 | Gericke ........................ 137/43 |
| 6,866,058 | B1* | 3/2005 | Brock et al. ................. 137/202 |
| 6,918,405 | B1* | 7/2005 | Leonhardt .................... 137/202 |

\* cited by examiner

*Primary Examiner*—Kevin Lee
(74) *Attorney, Agent, or Firm*—Barnes & Thornburg

(57) ABSTRACT

An apparatus is provided for controlling discharge of fuel vapor from an interior region in a fuel tank and preventing unsatisfactory liquid fuel levels within the interior region of the fuel tank. The apparatus includes a buoyant fill-limit valve movable to open and close a vapor outlet opening.

32 Claims, 5 Drawing Sheets

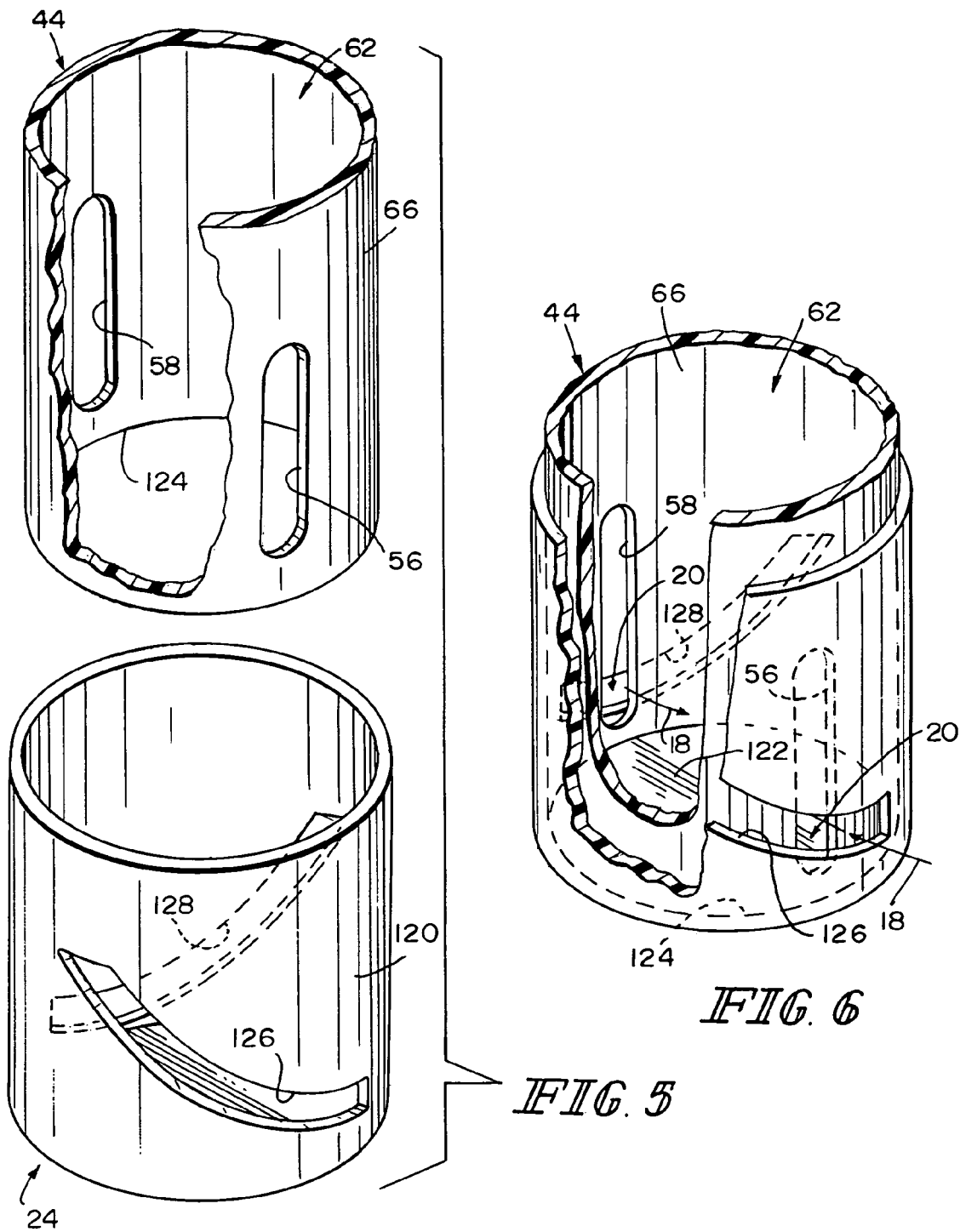

FUEL TANK VENT SYSTEM WITH VARIABLE-HEIGHT FUEL LEVEL SHUT-OFF PORT

BACKGROUND

The present disclosure relates to a fuel tank vent system, and particularly, to vent apparatus which operates to seal the vapor space in the interior region of a fuel tank during refueling and reopens at some point after refueling has been completed to vent the vapor space. More particularly, the present disclosure relates to a float-actuated fill-limit valve included in a tank-mounted vent apparatus.

Management of fuel vapor onboard a vehicle is an important part of modern vehicle fuel system design. A fuel tank vent system selectively discharges pressurized fuel vapor from a fuel tank in response to rising levels of liquid fuel in the fuel tank during fuel tank refueling and also during development of high tank pressure conditions. Buoyant float valves often are used to close vent outlets in fuel tank vent systems because they are able to float on liquid fuel as it rises in a fuel tank that is being filled with fuel discharged by a fuel-dispensing pump nozzle and thus move upwardly on the rising liquid fuel in the fuel tank to close a vent outlet when the tank is filled with fuel.

Fuel-dispensing pump nozzles are known to include a fill-limiting sensor for shutting off the flow of fuel from the nozzle when the fuel tank is nearly filled. Typically, this fill-limiting sensor is triggered whenever the fuel tank is full and fuel "backs up" the filler neck to splash onto or reach the fill-limiting sensor located on the nozzle.

SUMMARY

A tank vent apparatus includes a fixture formed to include a valve chamber leading to a vapor discharge port and containing a buoyant fill-limit valve that is movable to open and close the vapor discharge port. In illustrative embodiments, a fuel entry port is provided to conduct liquid fuel and/or fuel vapor from the fuel tank into the valve chamber. The fuel entry port is defined at the intersection of a first inner slot formed in the fixture and a first outer slot formed in a fill-limit adjustor that is mounted for movement on the fixture.

Also in illustrative embodiments, the fill-limit adjustor includes a sleeve that is mounted for rotation on an exterior surface of the fixture during assembly of the vent apparatus at a manufacturing plant. The sleeve is formed to include the first outer slot.

During assembly of various components to form the vent apparatus, the fill-limit adjustor is moved (e.g., rotated) relative to the fixture to adjust the "fill-limit" level of the vent apparatus by locating the fuel entry port in a predetermined position that is appropriate for the fuel tank that will carry the vent apparatus. Such movement of the fill-limit adjustor acts to change the "elevation" of the intersection point of the first inner and outer slots and thus vary the location of the fuel entry port on the vent apparatus between "lowest" and "highest" positions. The fuel entry port can be located at any position between (and including) the lowest and highest position easily as a result of movement of the fill-limit adjustor relative to the fixture during manufacture of the vent apparatus.

Once the fuel entry port is formed to lie in the predetermined position specified for a certain vehicle fuel tank, the fill-limit adjustor is welded or otherwise coupled in a fixed position to the fixture so that the fuel entry port is set permanently in the predetermined position. Then the assembled vent apparatus can be mounted in an aperture formed in a top wall of a fuel tank using any suitable means.

When the fuel entry port is formed to lie in a lowest position, it is in a position that is generally a "closest" to the floor of the fuel tank in which the vent apparatus is mounted. This "low-elevation" position of the fuel entry port on the vent apparatus means that rising liquid fuel extant in the fuel tank during tank refueling will flow at an "early" stage of the tank refueling process into the valve chamber through the "low-elevation" fuel entry port and move the buoyant fill-limit valve quickly to its closed position blocking further discharge of fuel tank fuel vapor through the vent apparatus and causing shutoff of the fuel-dispensing pump nozzle in the fuel tank filler neck. Under these conditions, the volume of liquid fuel in a "full" tank is minimized.

In contrast, when the fuel entry port is formed to lie at a highest position, it is in a higher position that is generally "farthest" from the floor of the fuel tank in which the vent apparatus is mounted. This "high-elevation" position of the fuel entry port on the vent apparatus means that rising liquid fuel extant in the fuel tank during tank refueling will flow at a "later" stage of the tank refueling process (when more fuel is extant in the fuel tank) into the valve chamber through the "high-elevation" fuel entry port and thus delay somewhat movement of the buoyant fill-limit valve to its closed position. This leads to a "later" pump nozzle shutoff and a "fuller" fuel tank filled with more fuel.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 5 is an enlarged perspective view of (1) the float tube (with portions broken away) included in the valve container and formed to include spaced-apart first and second inner slots and of (2) the fill-limit adjustor sleeve that is formed to include spaced-apart first and second outer slots and sized to surround and rotate around the float tube as shown, for example, in FIG. 6;

FIG. 6 is a perspective view similar to FIG. 5 showing placement of the fill-limit adjustor sleeve on the float tube to form (1) a first fuel entry port (at the intersection of the first inner and outer slots) to provide first means for admitting liquid fuel from the fuel tank into a valve chamber formed in the float tube and (2) a second fuel entry port (at the intersection of the second inner and outer slots) to provide second means for admitting liquid fuel from the fuel tank into the valve chamber formed in the float tube;

FIG. 7 is a sectional side elevation view of the system illustrated in FIG. 1 showing discharge of liquid fuel from a pump nozzle into a fuel tank before the fuel level has risen high enough to reach a "lowest-elevation" first fuel entry port (established by rotating the fill-limit adjustor sleeve to assume the first position) and showing flow of displaced fuel vapor through that lowest-elevation first fuel entry port past the "opened" fill-limit valve toward a vapor recovery canister coupled to a discharge outlet formed in the container lid;

FIG. 8 is a sectional view similar to FIG. 7 a moment later after liquid fuel has passed through the lowest-level first fuel entry port into a lower region of the valve chamber provided in the float tube under the float and begun to rise inside the float tube toward the float included in the fill-limit valve located in an upper region of the valve chamber formed in the float tube;

FIG. 9 is a sectional view similar to FIGS. 7 and 8 another moment later after liquid fuel has risen high enough inside the float tube to float the float and thereby raise the closure coupled to the float to close a vapor outlet opening formed in the valve container;

FIG. 10 is a sectional side elevation view of the system illustrated in FIG. 1 (after rotation of the fill-limit adjustor sleeve relative to the float tube) showing discharge of liquid fuel from a pump nozzle into a fuel tank before the fuel level has risen high enough to reach a "highest-elevation" first fuel entry port (established by rotating the fill-limit adjustor sleeve to assume the second position) and showing flow of displaced fuel vapor through that highest-elevation first fuel entry port past the opened fill-limit valve toward a vapor recovery canister coupled to a discharge outlet formed in the container lid;

FIG. 11 is a sectional view similar to FIG. 10 a moment later after liquid fuel has passed through the highest-level first fuel entry port into the lower region of the valve chamber provided in the float tube under the float and begun to rise inside the float tube toward the float included in the fill-limit valve located in the upper region of the valve chamber formed in the float tube; and FIG. 12 is a sectional view similar to FIGS. 10 and 11 another moment later after liquid fuel has risen high enough inside the float tube to float the float and thereby raise the closure coupled to the float to close the vapor outlet opening formed in the valve container.

DETAILED DESCRIPTION

Figure 1:
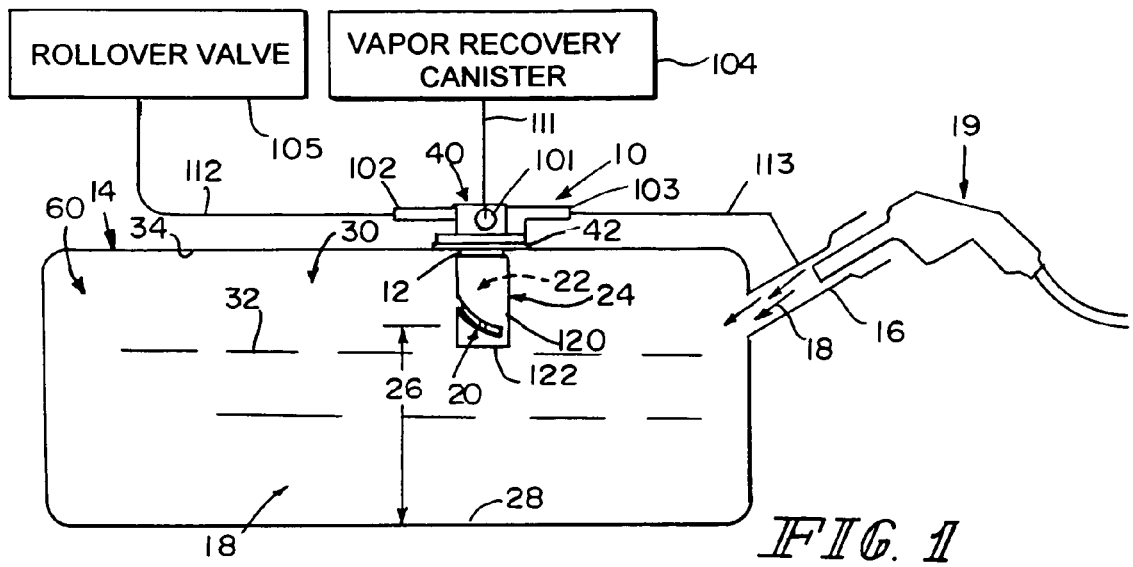
FIG. 1 is a diagrammatic illustration of a tank venting system including a vent apparatus in accordance with the present disclosure coupled to a fuel tank, the vent apparatus including a fill-limit adjustor sleeve formed to include a slot and mounted for rotation about a valve container located in the fuel tank and configured to hold a movable fill-limit valve.

A vent apparatus 10 is adapted to be mounted in an aperture 12 formed in a fuel tank 14 having a filler neck 16 as shown in FIG. 1. Vent apparatus 10 provides a "fill-limit" device that operates to regulate flow of fuel vapor from fuel tank 14 to destinations outside fuel tank 14 so as to limit the amount of fuel 18 that can be discharged by a fuel-dispensing pump nozzle 19 during tank refueling activities. Such a limitation serves to regulate the maximum amount of fuel 18 that can be admitted into fuel tank 14 and thus defines the fill-limit of fuel tank 14.

Figure 8:
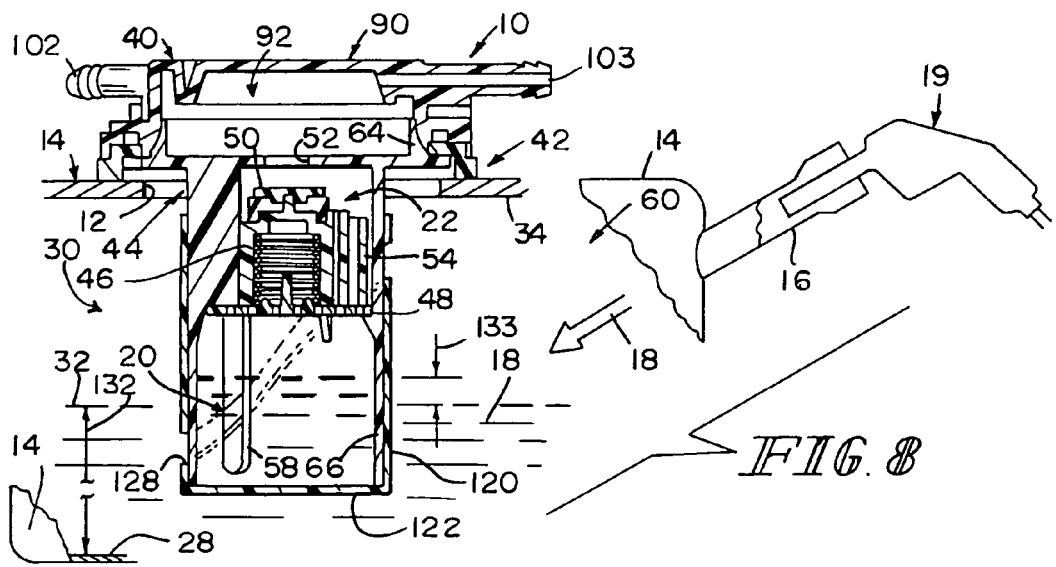
Figure 9:
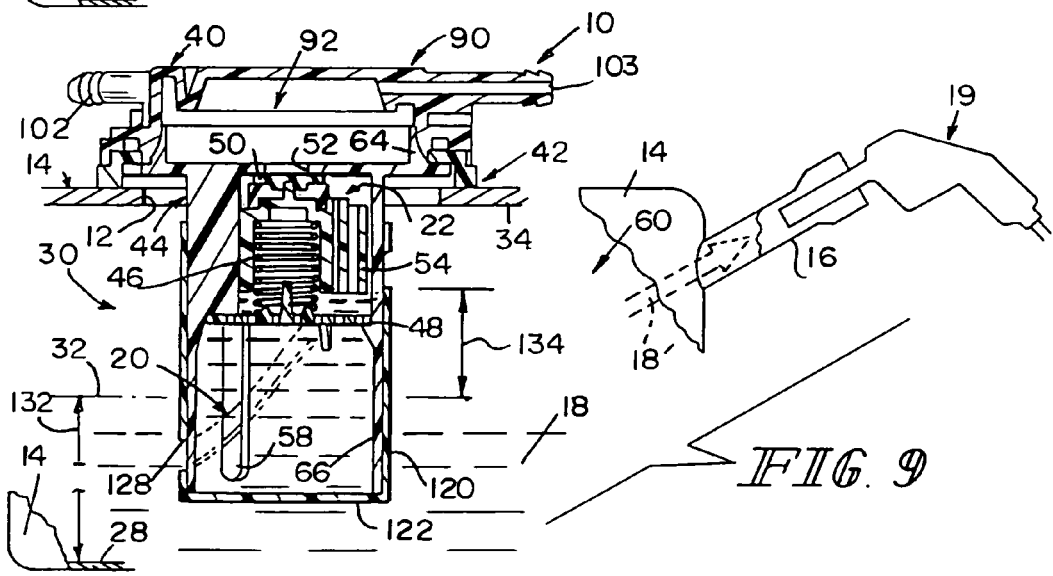
Figure 11:
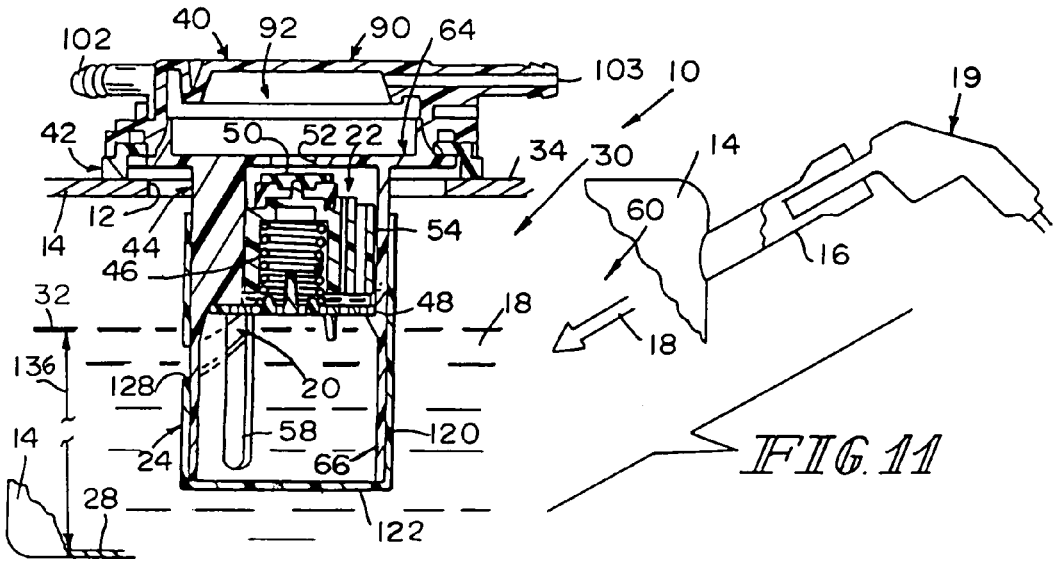
Figure 12:
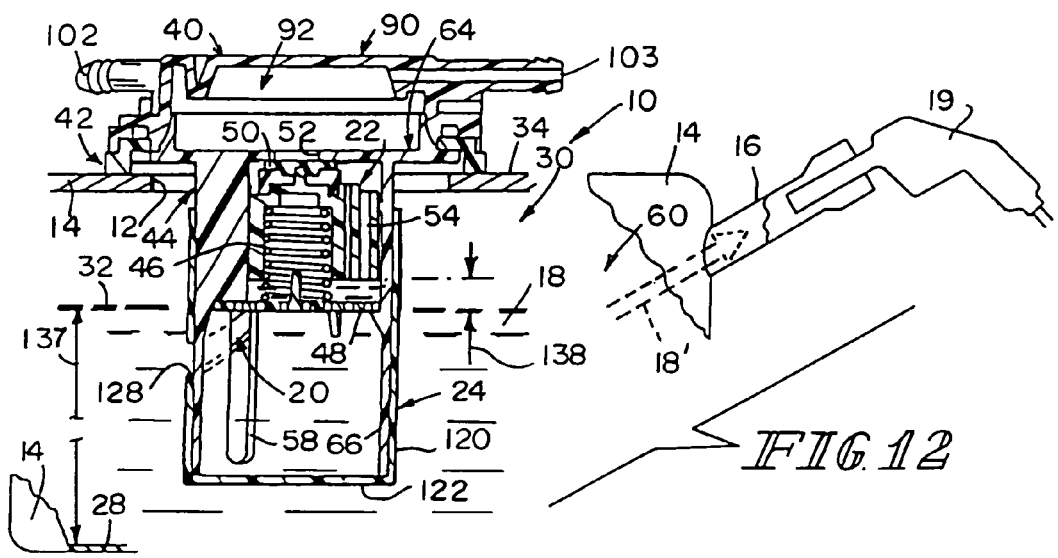

A fuel entry port 20 is provided to allow fuel 18 to flow into interior regions of vent apparatus 10 to reach a fill-limit valve 22 located therein and configured to "react" in any suitable manner to block discharge of fuel vapor from vent apparatus 10 once the level of fuel 18 in fuel tank 14 (and vent apparatus 10) has risen to a highest predetermined level. A fill-limit adjustor 24 is mounted to be moved relative to other components included in vent apparatus 10 during manufacture of vent apparatus 10 to vary the elevation 26 of fuel entry port 20 above a floor 28 (or other reference point) of fuel tank 14. By changing elevation 26 of fuel entry port 20, it is possible to cause "earlier" shut-off of pump nozzle 19 during refueling (so a filled fuel tank contains fewer gallons of fuel) or to cause "later" shut-off of pump nozzle 19 during refueling (so that a filled fuel tank contains more gallons of fuel). Fuel entry port 20 can be located anywhere between: (1) a "lowest" location in fuel tank 14 as shown, for example, in FIGS. 2 and 7–9 to establish a lowest fill-limit level of fuel 18 in fuel tank 14 as shown in FIG. 9 and (2) a "highest" location in fuel tank 14 as shown, for example, in FIGS. 3 and 10–12 to establish a highest fill-limit level of fuel 18 in fuel tank 14 as shown in FIG. 12.

The space 30 in fuel tank 14 above top surface 32 of fuel 18 and below top wall 34 of fuel tank 14 is known as the "vapor space" and contains fuel vapor extant in fuel tank 14. Vent apparatus 10 operates to vent pressurized fuel vapor from vapor space 30 at the proper time and also operates to block unwanted discharge of fuel 18 and fuel vapor from fuel tank, in the illustrated embodiment, through aperture 12 formed in top wall 34 of fuel tank 14.

Figure 4:
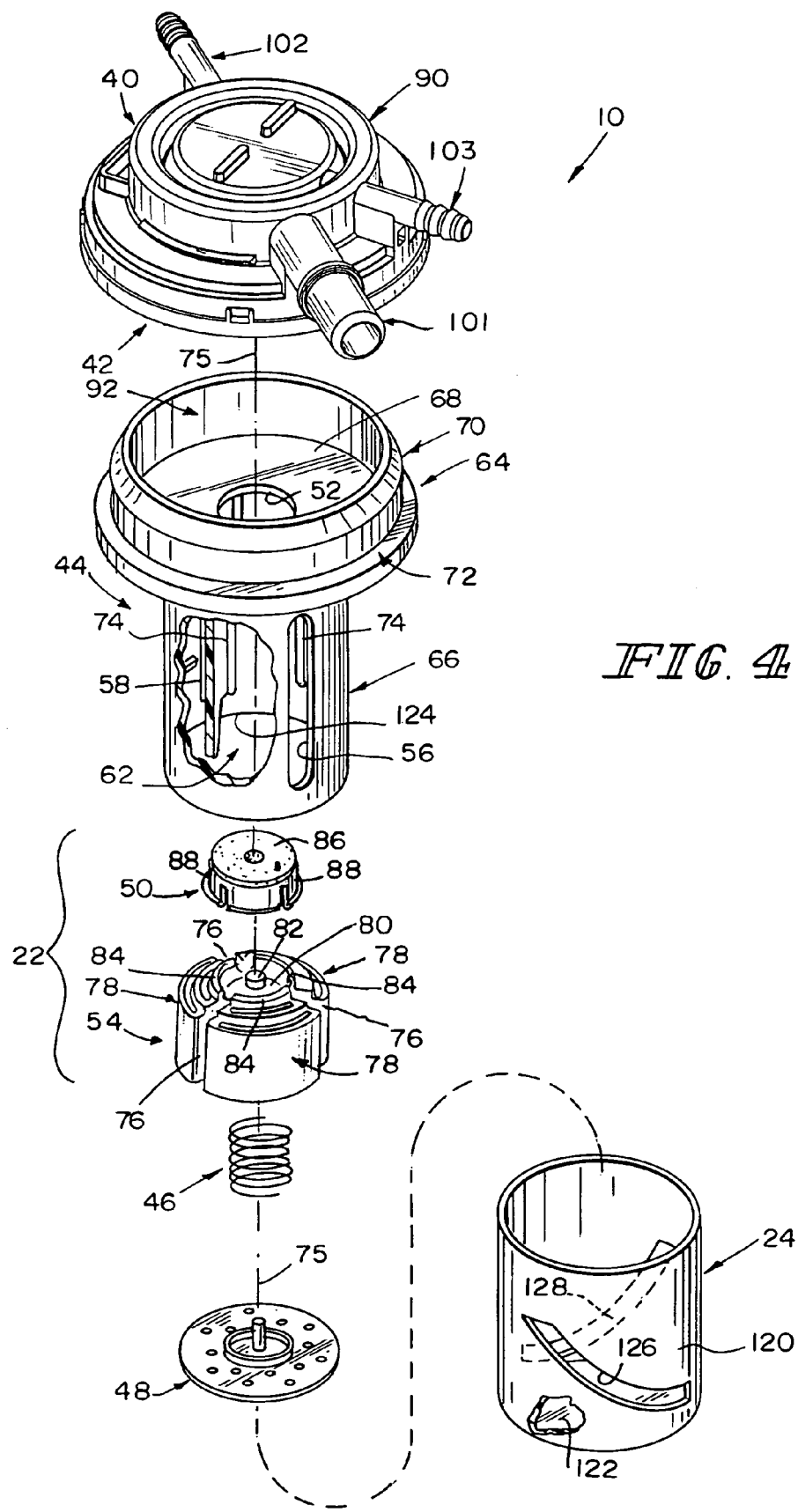
FIG. 4 is an exploded assembly view of the vent apparatus of FIGS. 1–3 showing, in sequence (top to bottom), a container lid including three radially extending tubes, a mount ring arranged to abut an underside of the container lid, a valve container including a tube support configured to mate with the container lid and the mount ring and a float tube arranged to extend downwardly from the tube support, a fill-limit valve including a closure and an underlying float, a float-biasing spring, a perforated retainer to mount in the valve container and support the float-biasing spring under the fill-limit valve, and a fill-limit adjustor sleeve configured to rotate around the float tube.

In an illustrative embodiment shown in FIG. 4, vent apparatus 10 includes a container lid 40, a mount ring 42 under container lid 40, a valve container 44, fill-limit valve 22, a float-biasing spring 46, a valve retainer 48, and fill-limit adjustor 24. Fill-limit valve 22 includes a closure 50 that is movable to close a vapor outlet opening 52 formed in valve container 44 and a buoyant float 54 arranged to underlie closure 50 and engage an upper end of float-biasing spring 46. These components can be assembled at a manufacturing plant to produce vent apparatus 10. It is within the scope of this disclosure to use a suitable non-buoyant fill-limit valve that reacts to the presence of fuel 18 in vent apparatus 10 to move to a position closing vapor outlet opening 52.

As suggested, for example, in FIGS. 2, 3, 5, and 6, the location (e.g., elevation) of fuel entry port 20 on vent apparatus 10 is established during component assembly by movement of fill-limit adjustor 24 relative to valve container 44. In the illustrated embodiment, there are two fuel entry ports 20 as shown in FIG. 6 and each fuel entry port 20 is defined at the intersection of an inner slot (56 or 58) formed in valve container 44 and an outer slot (126 or 128) formed in fill-limit adjustor 24. In the illustrated embodiment, each of inner slots 56, 58 is straight and each of outer slots 126, 128 is curved. It is within the scope of this disclosure to provide angled outer slots 126, 128 rather than curved outer slots 126, 128. It is within the scope of this disclosure to form angled or curved inner slots 56, 58 and form straight outer slots 126, 128. Either set of slots can have any suitable shape as long as the adjustment of the relative relationship of the two slots results in a vertical change of the fuel entry ports 20.

Figure 2:
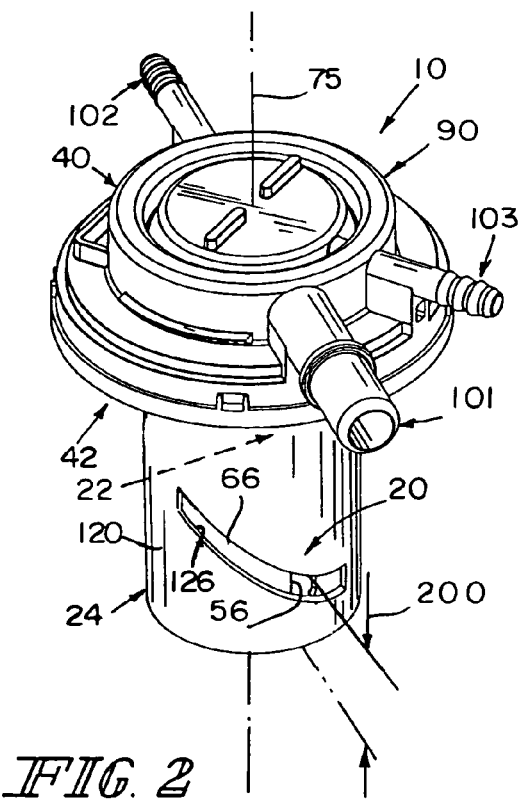
FIG. 2 is an enlarged perspective view of the vent apparatus of FIG. 1 showing the fill-limit adjustor sleeve rotated about the valve container to assume a first position establishing a "lowest" fill-limit level of liquid fuel in a fuel tank that, once reached during vehicle refueling, will cause the buoyant fill-limit valve to move upwardly to assume a vent-closing position resulting in "earlier" automatic shut-off of a fuel-dispensing pump nozzle inserted into a fuel tank filler neck (as suggested in FIG. 9)

As suggested in FIG. 2, a lowest fuel entry port 20 has an upper boundary that is a distance 200 above a bottom edge of fill-limit adjustor 24. Lowest fuel entry port 20 is also located at a first distance 201 below valve retainer 48 as shown best in FIG. 7.

Figure 3:
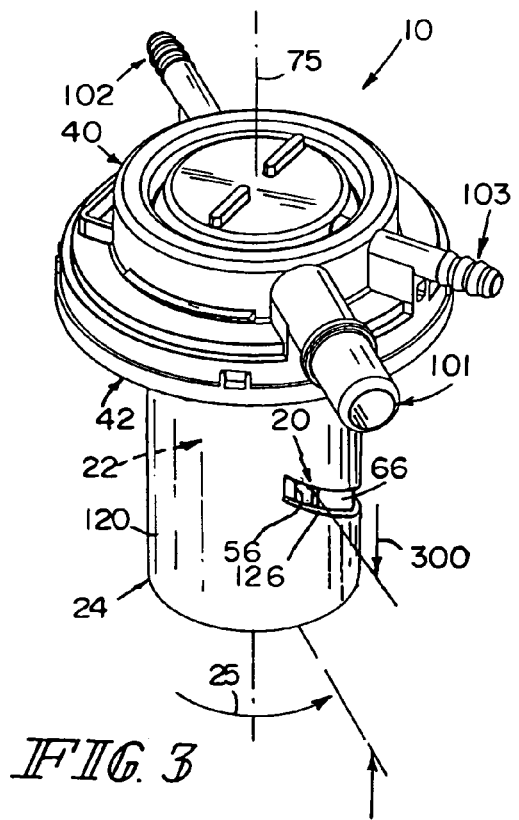
FIG. 3 is a view similar to FIG. 2 showing counterclockwise rotation of the fill-limit adjustor sleeve about a vertical axis relative to the valve container to assume a second position establishing a "highest" fill-limit level of liquid fuel in a fuel tank that, once reached during vehicle refueling, will cause "delayed" movement of the buoyant fill-limit valve to assume the vent-closing position resulting in "later" automatic shut-off of the fuel-dispensing nozzle (as suggested in FIG. 12)

As suggested in FIG. 3, fill-limit adjustor 24 is rotated in direction 25 relative to valve container 44 to define a highest fuel entry port 20 that has an upper boundary that is a distance 300 above a bottom edge of fill-limit adjustor 24. Highest fuel entry port 20 is also located at a second distance 301, which is less than first distance 201, below valve retainer 48 as shown best in FIG. 10.

Once fuel entry port 20 is located in a predetermined position specified to set the fill limit for a certain vehicle tank, fill-limit adjustor 24 is welded or otherwise coupled in a fixed position to a suitable portion of vent apparatus 10 so that each fuel entry port 20 is set permanently in its predetermined position. Then the assembled vent apparatus 10 can be mounted in aperture 12 formed in top wall 34 of fuel tank 14 or other suitable location on fuel tank 14 using any suitable means as suggested, for example, in FIG. 1.

Valve container 44 is adapted to be mounted in top wall 34 of fuel tank 14 as shown, for example, in FIGS. 7–12. As suggested in FIG. 4, valve container 44 is formed to include first and second inner slots 56, 58 adapted for communicating with an interior region 60 of fuel tank (when vent apparatus 10 is mounted on fuel tank 14 as shown, for example, in FIG. 1). Valve container 44 also is formed to include vapor outlet opening 52 and a valve chamber 62 interconnecting first and second inner slots 56, 58 and vapor outlet opening 52 as suggested in FIG. 4.

Figure 7:
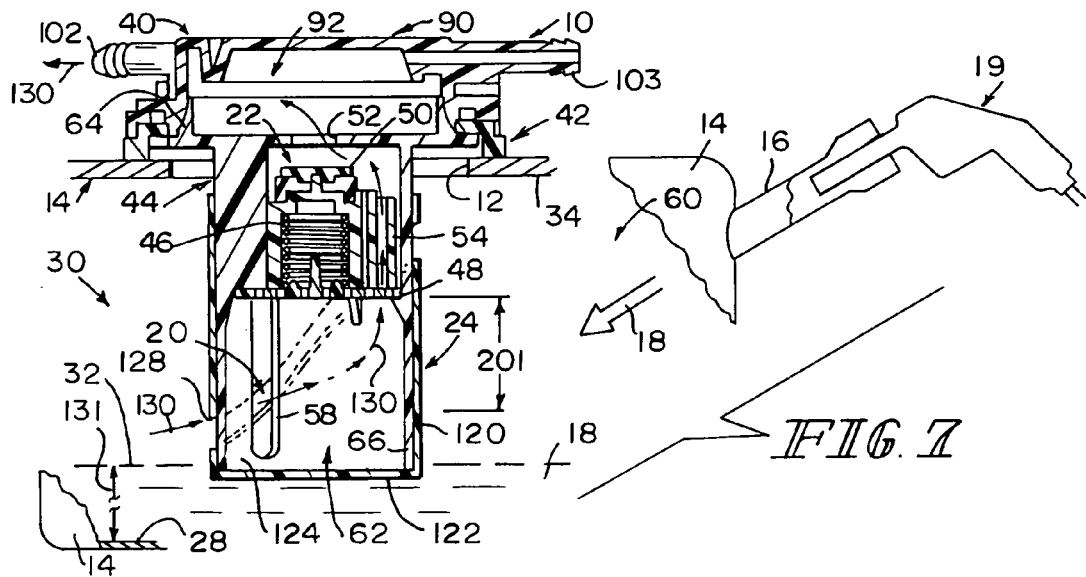
FIGS. 7–9 show a sequence of events to illustrate "early" automatic shut-off of a fuel-dispensing pump nozzle when the fill-limit adjustor sleeve is rotated about the float tube to assume the first or lowest position corresponding to the lowest fill-limit level of liquid fuel in the fuel tank.

Fill-limit valve 22 is disposed in valve chamber 62 formed in valve container 44 as shown, for example, in FIG. 7. Fill-limit valve 22 is mounted for movement between "opened" positions allowing flow of fuel vapor out of interior region 60 of fuel tank 14 through vapor outlet opening 52 as shown, for example, in FIGS. 7, 8, 10, and 11 and a "closed" position preventing flow of fuel vapor through vapor outlet opening 52 as shown, for example, in FIGS. 9 and 12.

As suggested in FIG. 4, valve container 44 includes a tube support 64 and a float tube 66. Tube support 64 is adapted to mate with container lid 40 and mount ring 42 in a manner shown, for example, in FIGS. 7–12 to support float tube 66 in aperture 12 formed in top wall 34 of fuel tank 14. Float tube 66 is formed to include valve chamber 62 and first and second inner slots 56, 58 as shown, for example, in FIGS. 4 and 5.

Tube support 64 includes a top wall 68 formed to include vapor outlet opening 52, an annular lid support 70 rising upwardly from top wall 68 to mate with container lid 40, and an annular outer flange 72 surrounding annular lid support 70 as shown, for example in FIGS. 4 and 7. Float tube 66 is a thin-walled cylindrical tube having an upper end cantilevered to an underside of top wall 68 to surround vapor outlet opening 52 and a lower end adapted to extend downwardly toward floor 28 of fuel tank 28 once vent apparatus 10 is mounted in fuel tank 14. Float tube 66 also includes a cylindrical exterior surface in the illustrated embodiment. In the illustrated embodiment, valve container 44 is a monolithic element made of a plastics material.

As suggested in FIG. 4, float tube 66 includes a cylindrical interior wall arranged to surround float member 54 of fill-limit valve 22 (once fill-limit valve 22 is positioned to lie in valve chamber 62). Float tube 66 also includes three circumferentially spaced-apart guide ribs 74. These guide ribs 74 are arranged to extend radially inwardly toward a central vertical axis 75 of valve container 44 and into companion rib-receiving slots 76 formed in float member 54. Guide ribs 74 thus mate with float member 54 and block rotation of float member 54 about central vertical axis 75 during axial up-and-down movement of float member 54 in float tube 66 as fill-limit valve 22 moves between the opened and closed positions. Float member 54 includes three wing segments 78 separated by rib-receiving slots 76 and a chamber (see FIG. 7) for receiving an upper end of float-biasing spring 46. Float member 54 also includes a dome 80 carrying a nipple 82 and several annular retaining lips 84 around a perimeter portion of dome 80. Closure 50 includes a seal 86 made of a gasket seal-type material and a frame including a plate supporting seal 86 and legs 88 configured to engage annular retaining lips 84 on float member 54.

Perforated retainer plate 48 is coupled to float tube 66 as suggested in FIG. 7. Retainer plate 48 is arranged to partition valve chamber 62 to include an upper region communicating with vapor outlet opening 52 and a lower region lying below vapor outlet opening 52. Fill-limit valve 22 is located in the upper region of valve chamber 62 as suggested in FIGS. 7–9 to encounter liquid fuel 18 rising from the lower region into the upper region via openings (of any suitable kind) formed in perforated valve retainer 48.

Float-biasing spring 46 is a compression spring in the illustrated embodiment. An upper end of float-biasing spring 46 extends into a downwardly opening chamber formed in float member 54. A lower end of float-biasing spring engages perforated retainer plate 48. Spring 46 applies an upwardly directed force to float member 54 by acting against dome 80 and retainer plate 48 to assist in lifting float member 54 whenever float member 54 is exposed to rising levels of liquid fuel 28. Spring 46 also applies a biasing force to buoyant member 54 to maintain closure 50 in a closed position if vent apparatus 10 is inverted during a vehicle accident.

Figure 10:
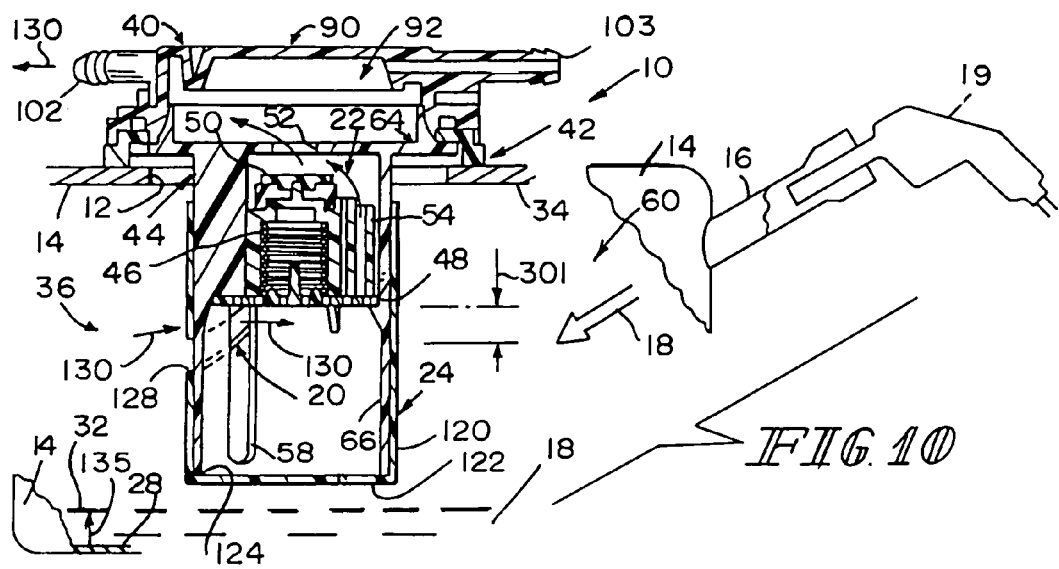
FIGS. 10–12 show a sequence of events to illustrate "later" automatic shut-off of a fuel-dispensing pump nozzle when the fill-limit adjustor sleeve is rotated about the float tube to assume the second or highest position corresponding to the highest fill-limit level of liquid fuel in the fuel tank.

Container lid 40 includes a shell 90 that cooperates with tube support 64 to form a fuel vapor plenum 92 located to receive fuel vapor discharged through vapor outlet opening 52 as suggested in FIGS. 7 and 10. Container lid 40 also includes, in the illustrated embodiment, first, second, and third vapor discharge ports 101, 102, 103 configured to discharge fuel vapor collected in fuel vapor plenum 92 to various external destinations. In the illustrated embodiment, fuel 18 is gasoline, and in that case, first vapor discharge port 101 is coupled by hose 111 to a fuel vapor recovery canister 104, second vapor discharge port 102 is coupled by a hose 112 to a grade rollover valve 105, and third vapor discharge port 103 is coupled by a hose 113 to filler neck 16. If, in alternative environment, fuel 18 was diesel fuel, then third vapor discharge port 103 would be "capped off" and first vapor discharge port 101 would be connected to a vent line with a vent cap at the end of the line.

Mount 42 is shown to be a ring in the illustrated embodiment. It is within the scope of this disclosure to employ any suitable shape for mount 42. In an illustrative embodiment, mount 42 is coupled to shell 90 of container lid 40 and to annular outer flange 72 of tube support 62 using any suitable means and made of a weldable plastics material that can be welded to top wall 34 of fuel tank 14. Mount 42 operates to retain tube support 64 in a fixed position in aperture 12 formed in top wall 34.

Fill-limit adjustor 24 includes a cylindrical sleeve 120 and a round floor or closure wall 122 coupled to a lower end of sleeve 120 as shown, for example, in FIGS. 4–6. Sleeve 120 is mounted for rotation about float tube 66 of valve container 44. In the illustrated embodiment, sleeve 120 includes a cylindrical interior surface that is arranged to lie in rotative bearing engagement with a cylindrical exterior surface of float tube 66 as suggested in FIG. 6 during rotating movement of sleeve 120 between the first and second positions shown, for example, in FIGS. 2 and 3. Sleeve 120 is retained in such a rotatable manner using any suitable means such as, for example, staking, welding, or snap engagement.

Fill-limit adjustor sleeve 120 is formed to include first and second outer slots 126, 128 as shown, for example, in FIGS. 4–6. In the illustrated embodiment, each outer slot 126, 128 is curved and arranged to wind in a helical pattern about a portion of fill-limit adjustor sleeve 120. Closure wall 122 of fill-limit adjustor 24 is arranged to block flow of liquid fuel 18 extant in fuel tank 14 into valve chamber 62 through a downwardly facing opening 124 formed in a lower end of float tube 66 of valve container 44 as suggested, for example, in FIGS. 1 and 7.

As shown best in FIG. 6, first outer slot 126 formed in fill-limit adjustor sleeve 120 intersects first inner slot 56 formed in float tube 66 to define a fuel entry port 20 into valve chamber 62. Similarly, second outer slot 128 formed in fill-limit adjustor sleeve 120 intersects second inner slot 58 formed in float tube 66 to define another fuel entry port 20 into valve chamber 62.

During component assembly, fill-limit adjustor sleeve 120 can be rotated (or otherwise moved) relative to float tube 66 about central vertical axis 75 to assume a first position wherein first inner and outer slots 56, 126 intersect to define a "lowest" fuel entry port 20 located in a lowest position as shown, for example, in FIGS. 2 and 7–9, to communicate rising liquid fuel extant in fuel tank 14 into valve chamber 62 through the lowest fuel entry port to fill-limit valve 22 so as to establish a lowest fill-limit level of liquid fuel 18 in fuel tank (see FIG. 9). In that first position, second inner and outer slots 58, 128 also intersect to define another lowest fuel entry port 20. When sleeve 120 is rotated to assume this first position, the volume of liquid fuel in a fuel tank is minimized.

Alternatively, during component assembly, fill-limit adjustor sleeve 120 can be rotated (or otherwise moved) relative to float tube 66 to assume a second position wherein first inner and outer slots 58, 128 intersect to define a "highest" fuel entry port 20 located in a highest position as shown, for example, in FIGS. 3 and 10–12, to communicate rising liquid fuel 18 extant in fuel tank 14 into valve chamber 62 through the highest fuel entry port 20 to fill-limit valve 22 so as to establish a highest fill-limit level of liquid fuel 18 in fuel tank 14. In that second position, second inner and outer slots 58, 128 also intersect to define another highest fuel entry port 20. When sleeve 120 is rotated to assume this second position, rising liquid fuel 18 extant in fuel tank 14 during tank refueling will flow at a later stage of the tank refueling process (when more fuel 18 is extant in fuel tank 14) into valve chamber 62 through such a "high-elevation" fuel entry port 20 and thus delay somewhat movement of buoyant fill-limit valve 22 to its closed position (see FIG. 12). This leads to a later shut-off of fuel-dispensing pump nozzle 19 and a fuller fuel tank 14 filled with more fuel 18.

In illustrative embodiments, float tube 66 and fill-limit adjustor sleeve 120 are each formed to include slots 56, 58 and 126, 128, respectively. When components 66 and 120 are axially assembled and radially moved, such movement yields one or more openings between the components that travels longitudinally about axis 75 of vent apparatus 10 due to "radial clocking" of sleeve 120 relative to tube 66.

During tank refueling, liquid fuel 18 is dispensed into interior region 60 of fuel tank 12 through filler neck 16 by fuel-dispensing pump nozzle 19 as suggested in FIGS. 7, 8, 10, and 11. Pump nozzle 19 includes a fill-limiting sensor (not shown) for shutting off the flow of fuel 18 from pump nozzle 19 when fuel tank 14 is nearly filled. As suggested in FIGS. 9 and 12, this fill-limiting sensor is triggered when fuel tank 14 is "full" and liquid fuel 18' "backs up" filler neck 16 to splash onto or reach the fill-limiting sensor located on nozzle 19.

In the sequence shown in FIGS. 7–9, when fuel entry ports 20 are at the lowest positions and when liquid fuel 18 has risen to depth 131 below fuel entry ports 20, pressurized fuel vapor 130 passes from vapor space 30 to a destination outside of fuel tank 14 via valve chamber 62, vapor outlet opening 52, fuel vapor plenum 92, and one or more of vapor discharge ports 101, 102, 103. Then, as shown in FIG. 8, liquid fuel 18 will have risen to a depth 132 and pass through the lowest-level fuel entry port 20 into a lower region of valve chamber 62 provided in float tube 66 under float 54 and begin to rise a distance 133 inside float tube 66 toward float 54 in fill-limit valve 22 located in an upper region of valve chamber 62. Finally, a moment later, liquid fuel 18 will have risen high enough (e.g., a greater distance 134) inside float tube 66 to float the float 54 and thereby raise closure 50 coupled to float 54 to close vapor outlet opening 52 formed in valve container 44. Such closure will cause pressure of fuel vapor in vapor space 30 to increase and force some of liquid fuel 18' up filler neck 16 to reach a fill-limiting sensor (not shown) associated with pump nozzle 19.

In the sequence shown in FIGS. 10–12, when fuel entry ports 20 are at the highest positions and when liquid fuel 18 has risen to a depth 135 below fuel entry ports 20, pressurized fuel vapor 130 passes from vapor space 30 to a destination outside of fuel tank 14 via valve chamber 62, vapor outlet opening 52, fuel vapor plenum 92, and one or more discharge ports 101, 102, 103. Then, as shown in FIG. 11, liquid fuel 18 will have risen to a depth 136 (greater than depth 132) and pass through the highest-level fuel entry port 20 into a lower region of valve chamber 62 provided in float tube 66 under float 54 and begin to rise a short distance 137 inside float tube 66 toward float 54 in fill-limit valve 22 located in an upper region of valve chamber 62. Finally, a moment later, liquid fuel 18 will have risen high enough (e.g., a greater distance 138) inside float tube 66 to float the float 54 and thereby raise closure 50 coupled to float 54 to close vapor outlet opening 52 formed in valve container 44. Such closure will cause pressure of fuel vapor in vapor space 30 to increase and force some of liquid fuel 18' up filler neck 16 to reach a fill-limiting sensor (not shown) associated with pump nozzle 19.

What is claimed is:

1. A vent apparatus for controlling discharge of fuel vapor from within a fuel tank, the apparatus comprising
   a valve container adapted to be mounted in a top wall of the fuel tank, the valve container being formed to include a first inner slot adapted for communicating with an interior region of the fuel tank, a vapor outlet opening, and a valve chamber interconnecting the first inner slot and the vapor outlet opening,
   a fill-limit valve disposed in the valve chamber and mounted for movement between an opened position allowing flow of fuel vapor through the vapor outlet opening and a closed position preventing flow of fuel vapor through the vapor outlet opening, and
   a fill-limit adjustor sleeve formed to include a first outer slot and mounted for rotation about the valve container between a first position wherein the first inner and outer slots intersect to define a lowest fuel entry port located in a lowest position to communicate rising liquid fuel extant in the fuel tank into the valve chamber through the lowest fuel entry port to the fill-limit valve so as to establish a lowest fill-limit level of liquid fuel in the fuel tank and a second position wherein the first inner and outer slots intersect to define a highest fuel entry port located in a highest position above the lowest fuel entry port and below the vapor outlet opening to communicate rising liquid fuel extant in the fuel tank into the valve chamber through the highest fuel entry port to the fill-limit valve so as to establish a highest fill-limit level of liquid fuel in the fuel tank.

2. The apparatus of claim 1, wherein the valve container includes a float tube formed to include the valve chamber and the first inner slot, the valve container also includes a perforated valve retainer coupled to the float tube and arranged to partition the valve chamber to include an upper region communicating with the vapor outlet opening and a lower region lying below the vapor outlet opening, the fill-limit valve is located in the upper region to encounter liquid fuel rising from the lower region into the upper region via openings formed in the perforated valve retainer, and the first inner slot formed in the float tube and the first outer slot formed in the fill-limit adjustor sleeve cooperate to locate the lowest fuel entry port at a first distance below the perforated valve retainer upon rotation of the fill-limit adjustor sleeve about the float tube to assume the first position and to locate the highest fuel entry port at a lesser second distance below the perforated valve retainer upon rotation of the fill-limit adjustor sleeve about the float tube to assume the second position.

3. The apparatus of claim 2, wherein the first inner slot is straight and the first outer slot is curved.

4. The apparatus of claim 2, wherein the first outer slot is formed to wind in a helical pattern about a portion of the fill-limit adjustor sleeve.

5. The apparatus of claim 2, wherein the fill-limit adjustor sleeve is retained in a fixed position relative to the float tube to block rotation of the fill-limit adjustor sleeve relative to the float tube to establish a selected location for the fuel entry port during movement of liquid fuel through the fuel entry port established by the inner and outer slots.

6. The apparatus of claim 2, wherein the first inner slot extends in a vertical direction that is substantially parallel to an axis of rotation of the fill-limit adjustor sleeve about which the fill-limit adjustor sleeve is rotated about the float tube in response to movement of the fill-limit adjustor sleeve between the first and second positions.

7. The apparatus of claim 6, wherein the first outer slot is formed to wind in a helical pattern about a portion of the fill-limit adjustor sleeve.

8. The apparatus of claim 2, wherein the valve container further includes a top wall formed to include the vapor outlet opening, the float tube is cantilevered to the top wall to surround the vapor outlet opening and is formed to include a cylindrical exterior surface, and the fill-limit adjustor sleeve includes a cylindrical interior surface arranged to lie in rotative bearing engagement with the cylindrical exterior surface of the float tube during rotating movement of the fill-limit adjustor sleeve between the first and second positions.

9. The apparatus of claim 8, wherein the fill-limit valve includes a closure member arranged to close the vapor outlet opening upon movement of the fill-limit valve to the closed position and a float member arranged to lie under the closure member and formed to include rib-receiving slots and wherein the float tube includes an interior wall arranged to surround the float member and a pair of guide ribs appended to the interior wall and arranged to extend into rib-receiving slots formed in the float member to mate with the float member and block rotation of the float member relative to the float tube during axial up-and-down movement of the float member in the float tube as the fill-limit valve moves between the opened and closed positions and wherein the first inner slot is formed to lie in a space between the pair of guide ribs.

10. The apparatus of claim 1, wherein the valve container includes a tube support formed to include the vapor outlet opening, a float tube appended to an underside of the tube support and formed to include the valve chamber, a mount adapted to mate with the vehicle fuel tank at an aperture formed in the vehicle fuel tank, and a container lid coupled to the tube support to trap the mount therebetween and formed to include a vent tube configured to discharge fuel vapor admitted into a chamber formed in the container lid via the vapor outlet opening, and wherein the tube support is formed to include the first outer slot.

11. The apparatus of claim 10, wherein the tube support is formed to include a second outer slot and the fill-limit adjustor sleeve is mounted for rotation about the float tube between the first and second positions and is formed to include a second outer slot arranged to intersect the second inner slot formed in the tube support to form an auxiliary fuel entry port to communicate rising liquid fuel extant in the fuel tank into the valve chamber when the first inner and outer slots intersect to form another fuel entry port.

12. The apparatus of claim 11, wherein each of the first and second inner slots are straight.

13. The apparatus of claim 11, wherein each of the first and second outer slots are curved.

14. The apparatus of claim 11, wherein each of the first and second outer slots are formed to wind in a helical pattern about a portion of the fill-limit adjustor sleeve.

15. The apparatus of claim 11, wherein the fill-limit adjustor sleeve is retained in a fixed position relative to the float tube to block rotation of the fill-limit adjustor sleeve relative to the float tube during movement of liquid fuel through the fuel entry ports established by the inner and outer slots.

16. The apparatus of claim 11, wherein the float tube includes an upper end coupled to the container lid and an opposite lower end formed to include an opening, the fill-limit adjustor sleeve includes an upper end arranged to underlie the container lid and a lower end arranged to extend below the lower end of the float tube, and further comprising a closure wall coupled to the lower end of the fill-limit adjustor sleeve and arranged to block flow of liquid fuel extant in the fuel tank into the valve chamber through the opening formed in the lower end of the float tube.

17. The apparatus of claim 16, wherein the fill-limit adjustor sleeve is retained in a fixed position relative to the float tube to block rotation of the fill-limit adjustor sleeve relative to the float tube during movement of liquid fuel through the fuel entry ports established by the inner and outer slots.

18. The apparatus of claim 1, wherein the fill-limit adjustor sleeve is retained in a fixed position relative to the valve container to block rotation of the fill-limit adjustor sleeve relative to the valve container during movement of liquid fuel through the fuel entry port established by the first inner and outer slots.

19. The apparatus of claim 17, wherein the valve container includes an upper end associated with the vapor outlet opening and an opposite lower end formed to include a downwardly facing opening, the fill-limit adjustor sleeve includes an upper end arranged to extend toward the upper end of the valve container and a lower end arranged to extend below the lower end of the valve container, and further comprising a closure wall coupled to the lower end of the fill-limit adjustor sleeve and arranged to block flow of liquid fuel extant in the fuel tank into the valve chamber through the downwardly facing opening formed in the lower end of the valve container.

20. The apparatus of claim 17, wherein the first inner slot is straight and the first outer slot is curved.

21. The apparatus of claim 1, wherein the fill-limit adjustor sleeve is retained in a fixed position relative to the valve container to block rotation of the fill-limit adjustor sleeve relative to the valve container during movement of liquid fuel through the fuel entry port established by the first inner and outer slots.

22. A vent apparatus for controlling discharge of fuel vapor from within a fuel tank, the apparatus comprising
a float tube adapted to extend through an aperture formed in a top wall of the fuel tank, the float tube being formed to include a valve chamber and a first inner slot adapted for communicating with an interior region of the fuel tank to admit liquid fuel and fuel vapor from the fuel tank into the valve chamber,
a fill-limit valve disposed in the valve chamber and movable between an opened position allowing discharge of fuel vapor from the valve chamber through a vapor outlet opening associated with the valve chamber and a closed position blocking discharge of fuel vapor from the valve chamber through the vapor outlet opening, the fill-limit valve including a float member disposed in the valve chamber,
a valve retainer arranged to underlie the float member and retain the float member in the valve chamber to expose the float member to rising liquid fuel extant in the valve chamber, and
a fill-limit adjustor sleeve arranged to surround the float tube and formed to include a first outer slot located to intersect the first inner slot to define a fuel entry port to communicate rising liquid fuel extant in the fuel tank into the valve chamber to raise the float member in the valve chamber to move the fill-limit valve to the closed position and to establish a fill-limit level of liquid fuel in the fuel tank.

23. The apparatus of claim 22, wherein the fill-limit adjustor sleeve is mounted in rotative bearing engagement with the float tube to rotate relative to the float tube between a first position wherein the fuel entry port is located a first distance below and away from the valve retainer and a second position wherein the fuel entry port is located a lesser second distance away from the valve retainer.

24. The apparatus of claim 23, wherein the fill-limit adjustor sleeve is retained in a fixed position relative to the float tube following rotation of the fill-limit adjustor sleeve to assume a selected position establishing a selected location of the fuel entry port to block further rotation of the fill-limit adjustor sleeve during movement of liquid fuel through the fuel entry port established by the first inner and outer slots.

25. The apparatus of claim 24, wherein the first inner slot is straight and the first outer slot is curved.

26. The apparatus of claim 24, wherein the first outer slot is formed to wind in a helical pattern about a portion of the fill-limit adjustor sleeve.

27. The apparatus of claim 24, wherein the first inner slot extends in a vertical direction that is substantially parallel to an axis of rotation of the fill-limit adjustor sleeve about which the fill-limit adjustor sleeve is rotated about the float tube in response to movement of the fill-limit adjustor sleeve between the first and second positions.

28. The apparatus of claim 27, wherein the first outer slot is formed to wind in a helical pattern about a portion of the fill-limit adjustor sleeve.

29. The apparatus of claim 22, wherein the valve container includes an upper end associated with the vapor outlet opening and an opposite lower end formed to include a downwardly facing opening, the fill-limit adjustor sleeve includes an upper end arranged to extend toward the upper end of the valve container and a lower end arranged to extend below the lower end of the valve container, and further comprising a closure wall coupled to the lower end of the fill-limit adjustor sleeve and arranged to block flow of liquid fuel extant in the fuel tank into the valve chamber through the downwardly facing opening formed in the lower end of the valve container.

30. A vent apparatus for controlling discharge of fuel vapor from within a fuel tank, the apparatus comprising
a fixture adapted to extend through an aperture formed in a fuel tank to communicate with an interior region of the fuel tank, the fixture being formed to include a valve chamber, a vapor discharge port coupled in fluid communication to the valve chamber, and a first inner slot arranged to provide an opening for the valve chamber into the interior region of the fuel tank when the fixture is mounted on the fuel tank,
a fill-limit valve disposed in the valve chamber and mounted for movement between an opened position allowing flow of fuel vapor through the vapor discharge port and a closed position preventing flow of fuel vapor through the vapor discharge port,
a fill-limit adjustor arranged to extend along a surface of the fixture and formed to include a first outer slot arranged to intersect the first inner slot at an intersection point to establish a fuel entry port at the intersection point, and
means for establishing the fuel entry port at a variable but selected point along the first inner slot by moving the fill-limit adjustor relative to the fixture to vary the location of the intersection point between a lowest fuel entry port location establishing a lowest fill-limit level of liquid fuel in the fuel tank and a highest fuel entry port location establishing a highest fill-limit level of liquid fuel in the fuel tank and for retaining the fill-limit adjustor in a fixed position relative to the fixture at a selected fuel entry port location.

31. The apparatus of claim 30, wherein the fixture includes an annular side wall formed to define the surface of the fixture and include the first inner slot and the fill-limit adjustor includes a sleeve mounted for rotation relative to the annular side wall and formed to include the first outer slot.

32. The apparatus of claim 31, wherein the sleeve is arranged to surround the annular side wall.

* * * * *